(12) United States Patent
Nicolas et al.

(10) Patent No.: US 12,115,838 B2
(45) Date of Patent: Oct. 15, 2024

(54) METHOD FOR MANAGING A THERMAL MANAGEMENT DEVICE FOR A MOTOR VEHICLE AND ASSOCIATED THERMAL MANAGEMENT DEVICE

(71) Applicant: Valeo Systemes Thermiques, Le Mesnil Saint-Denis (FR)

(72) Inventors: Bertrand Nicolas, Le Mesnil Saint-Denis (FR); Jin-Ming Liu, Le Mesnil Saint-Denis (FR); Mohamed Yahia, Le Mesnil Saint-Denis (FR)

(73) Assignee: VALEO SYSTEMES THERMIQUES, Le Mesnil Saint-Denis (FR)

( * ) Notice: Subject to any disclaimer, the term of this patent is extended or adjusted under 35 U.S.C. 154(b) by 364 days.

(21) Appl. No.: 17/596,533

(22) PCT Filed: Jun. 10, 2020

(86) PCT No.: PCT/EP2020/066010
§ 371 (c)(1),
(2) Date: Dec. 13, 2021

(87) PCT Pub. No.: WO2020/249579
PCT Pub. Date: Dec. 17, 2020

(65) Prior Publication Data
US 2022/0234423 A1   Jul. 28, 2022

(30) Foreign Application Priority Data
Jun. 14, 2019   (FR) ...................... 1906394

(51) Int. Cl.
*B60H 1/32*   (2006.01)
*B60H 1/00*   (2006.01)

(52) U.S. Cl.
CPC ....... *B60H 1/3205* (2013.01); *B60H 1/00278* (2013.01); *B60H 1/3227* (2013.01);
(Continued)

(58) Field of Classification Search
CPC .............. B60H 1/3205; B60H 1/00278; B60H 1/3227; B60H 1/323; B60H 2001/00307;
(Continued)

(56) References Cited

U.S. PATENT DOCUMENTS 8,978,412 B2 *   3/2015   Ahn .................. F25B 41/335
62/200
2010/0023171 A1   1/2010   Bittner et al.
(Continued)

FOREIGN PATENT DOCUMENTS

CN   106169627 A   11/2016
CN   107499091 A   12/2017
(Continued)

OTHER PUBLICATIONS

Office Action Issued in Corresponding CN application No. 202080043815.1, Dated Jul. 12, 2023. (6 Pages).
(Continued)

*Primary Examiner* — Kun Kai Ma
(74) *Attorney, Agent, or Firm* — Osha Bergman Watanabe & Burton LLP (57) ABSTRACT

The invention concerns a method for managing a thermal management device (1) for a motor vehicle, comprising the following steps: —increasing the speed of rotation of the compressor (3) to its maximum speed, —determining a modified setpoint temperature (T15-*sp*3) of the third element (300) greater than the first setpoint temperature (T15-*sp*1), so that the temperature of the second element (200) at the outlet of the first evaporator (11) tends towards its setpoint temperature (T11-*sp*), —adjusting the opening diameter of the second expansion device (13) so that the temperature of the third element (300) at the outlet of the second evaporator (15) reaches a modified setpoint temperature (T15-*sp*3), until the temperature of the second element (200) at the (Continued)

outlet of the first evaporator (11) reaches the setpoint temperature (T11-*sp*). The invention further relates to the thermal management device (1) for implementing said management method.

10 Claims, 3 Drawing Sheets

(52) U.S. Cl.
CPC ............... *B60H 1/323* (2013.01); *B60H 2001/00307* (2013.01); *B60H 2001/3263* (2013.01); *B60H 2001/3272* (2013.01); *B60H 2001/3285* (2013.01)

(58) Field of Classification Search
CPC ............ B60H 2001/3263; B60H 2001/3272; B60H 2001/3285; B60H 2001/00928; B60H 1/00921; B60H 1/3216; F25B 41/385; F25B 41/39; F25B 2600/025; F25B 2600/0253; F25B 49/02; F25B 2600/2513; F25B 2700/197; F25B 2700/21173; F25B 2700/21175; F25B 5/02; F25B 49/022
See application file for complete search history.

(56) References Cited

U.S. PATENT DOCUMENTS

| 2011/0132013 | A1* | 6/2011 | Ahn | F25B 41/335 |
| --- | --- | --- | --- | --- |
| | | | | 62/507 |
| 2015/0013367 | A1 | 1/2015 | Carpenter | |
| 2017/0358833 | A1 | 12/2017 | Jalilevand et al. | |

FOREIGN PATENT DOCUMENTS

| DE | 102012210221 A1 | * | 12/2013 | ......... B60H 1/00278 |
| --- | --- | --- | --- | --- |
| DE | 102018201165 B3 | * | 5/2019 | |
| EP | 3228958 A2 | | 10/2017 | |
| FR | 3070316 A1 | | 3/2019 | |
| WO | WO-2017005559 A1 | * | 1/2017 | |
| WO | WO-2017167232 A1 | * | 10/2017 | ........... B60H 1/3204 |

OTHER PUBLICATIONS

International Search Report and Written Opinion in corresponding International Application No. PCT/EP2020/066010, mailed Jul. 22, 2020 (12 pages).
Office Action issued in Chinese Application No. 202080043815.1 mailed on Nov. 24, 2022 (8 pages).

* cited by examiner

METHOD FOR MANAGING A THERMAL MANAGEMENT DEVICE FOR A MOTOR VEHICLE AND ASSOCIATED THERMAL MANAGEMENT DEVICE

The present invention relates to a method for managing a thermal management device for a motor vehicle and to the thermal management device for implementing such a method.

More specifically, the invention relates to a management method for a thermal management device comprising a coolant circuit comprising two evaporators arranged parallel to each other and each comprising a dedicated coolant expansion device that is arranged upstream.

As a general rule, the two evaporators are dedicated to cooling separate elements such as, for example, an internal air flow intended for the passenger compartment of the motor vehicle for a first evaporator and electronic and/or electrical elements such as batteries for a second evaporator.

Nevertheless, sometimes the simultaneous use of the two parallel evaporators, in order to reach the required temperatures for each of these elements, demands cooling power that is greater than the maximum cooling power that can be delivered by the thermal management device. The power allocated to either one of the evaporators thus needs to be reduced as a function of a priority that is determined by parameters such as the temperature of the elements to be cooled, the setpoint temperatures to be reached for each of these elements and the conditions defined by the automotive manufacturers, for example.

Therefore, one of the aims of the present invention is to propose a method for managing a thermal management device in order to prioritize either one of the evaporators, as well as to propose a thermal management device suitable for such a management method.

Therefore, the present invention relates to a method for managing a thermal management device for a motor vehicle comprising a coolant circuit, in which a coolant is intended to circulate, said coolant circuit comprising:
  a main loop comprising, in the direction of circulation of the coolant, a compressor, a condenser configured to exchange heat energy with a first element, a first expansion device and a first evaporator configured to exchange heat energy with a second element;
  a bypass branch arranged parallel to the first expansion device and the first evaporator, said bypass branch comprising a second expansion device and a second evaporator arranged downstream of the second expansion device and configured to exchange heat energy with a third element,
when at least the first evaporator is used so that the temperature of the second element at the outlet of the first evaporator reaches a setpoint temperature,
a request to use the second evaporator is issued so that the third element reaches a first setpoint temperature,
so that the cooling power required for the simultaneous operation of the first and second evaporators is greater than the maximum cooling capacity of the thermal management device, and
so that the thermal management device receives a request for cooling priority via the first evaporator,
the management method comprises the following steps:
  increasing the speed of rotation of the compressor to its maximum speed;
  determining a modified setpoint temperature of the third element that is greater than the first setpoint temperature so that the temperature of the second element at the outlet of the first evaporator tends toward its setpoint temperature;
  adjusting the opening diameter of the second expansion device so that the temperature of the third element at the outlet of the second evaporator reaches a modified setpoint temperature, until the temperature of the second element at the outlet of the first evaporator reaches the setpoint temperature.

According to one aspect of the method according to the invention, when at least the first evaporator is used so that the temperature of the second element at the outlet of the first evaporator reaches a setpoint temperature,
a request to use the second evaporator is issued so that the third element reaches a first setpoint temperature,
so that the required cooling power is greater than the maximum cooling capacity of the thermal management device, and so that the thermal management device receives a request for cooling priority via the second evaporator,
the management method comprises the following steps:
  increasing the speed of rotation of the compressor to its maximum speed;
  adjusting the opening diameter of the second expansion device until the temperature of the third element at the outlet of the second evaporator reaches the first setpoint temperature.

According to another aspect of the method according to the invention, the management method comprises a step of adjusting the opening diameter of the first expansion device so that the sub-cooling of the coolant at the outlet of the condenser reaches a sub-cooling setpoint value, the sub-cooling being computed according to the following formula:

$$\text{SBC-calc} = T\text{reCO} - T\text{sat}(\text{PreCO}),$$

with SBC-calc being the computed sub-cooling, TreCO being the temperature of the coolant at the outlet of the condenser and Tsat (PreCO) being the saturation temperature of the coolant at the pressure of the coolant at the outlet of the condenser.

According to another aspect of the method according to the invention, the sub-cooling setpoint value is determined according to the following formula:

$$\text{SBC-sp} = (((mr/\ln(Pd+\beta))/k)-1)/\alpha,$$

with mr being the flow rate of the coolant, Pd being the coolant pressure at the outlet of the compressor, $\alpha = 4.525^{-2}$, $\beta = 1.7308$ and $k = 14.089 \times d^2$, d being the theoretical opening diameter of the first expansion device in millimeters for an optimal coefficient of performance.

The present invention also relates to a thermal management device for a motor vehicle comprising a coolant circuit, in which a coolant is intended to circulate, said coolant circuit comprising:
  a main loop comprising, in the direction of circulation of the coolant, a compressor, a condenser configured to exchange heat energy with a first element, a first expansion device and a first evaporator configured to exchange heat energy with a second element;
  a bypass branch arranged parallel to the first expansion device and the first evaporator, said bypass branch comprising a second expansion device and a second evaporator arranged downstream of the second expansion device and configured to exchange heat energy with a third element;

the thermal management device further comprising:
a first proportional-integral controller configured to control the speed of rotation of the compressor as a function of the difference between the temperature of the second element at the outlet of the first evaporator and a setpoint temperature of the second element at the outlet of the first evaporator;
a second proportional-integral controller configured to control the speed of rotation of the compressor as a function of the difference between the temperature of the third element at the outlet of the second evaporator and a first setpoint temperature of the third element at the outlet of the second evaporator;
a first adder arranged upstream of the compressor and configured to add the speed of rotation signals output from the first and second proportional-integral controllers;
a third proportional-integral controller configured to adjust the opening diameter of the second expansion device as a function of the difference between the temperature of the third element at the outlet of the second evaporator and a setpoint temperature of the third element at the outlet of the second evaporator;
an electronic control unit configured to determine a second setpoint temperature of the third element at the outlet of the second evaporator according to the difference between the temperature of the second element at the outlet of the first evaporator and the setpoint temperature of the second element at the outlet of the first evaporator;
a second adder configured to add the first and the second setpoint temperature of the third element at the outlet of the second evaporator in order to determine the setpoint temperature for the third proportional-integral controller.

According to another aspect of the invention, the thermal management device comprises a fourth proportional-integral controller configured to control the second setpoint temperature of the third element at the outlet of the second evaporator as a function of a setpoint determined by the electronic control unit.

According to another aspect of the invention, the thermal management device comprises a fifth proportional-integral controller configured to adjust the opening diameter of the first expansion device as a function of the difference between the computed sub-cooling of the coolant at the outlet of the condenser and the setpoint value of the sub-cooling of the coolant at the outlet of the condenser.

According to another aspect of the invention:
the condenser is a heat exchanger arranged in the front face of the motor vehicle and the first element is an external air flow;
the first evaporator is a heat exchanger arranged within a heating, ventilation and air conditioning device and the second element is an internal air flow intended for the passenger compartment, and
the second evaporator is configured to cool electrical and/or electronic elements such as batteries.

According to another aspect of the invention, the thermal management device comprises an auxiliary circuit, in which the third element circulates, the second evaporator being a dual-fluid heat exchanger configured to allow heat exchanges between the coolant and the third element.

According to another aspect of the invention, the thermal management device comprises a limiter arranged between the first adder and the compressor.

Further features and advantages of the present invention will become more clearly apparent upon reading the following description, which is provided by way of a non-limiting illustration, and with reference to the accompanying drawings, in which.

In the various figures, identical elements use the same reference numbers.

The following embodiments are examples. Although the description refers to one or more embodiments, this does not necessarily mean that each reference relates to the same embodiment, or that the features only apply to a single embodiment. Simple features of various embodiments also can be combined and/or interchanged in order to provide other embodiments.

In the present description, some elements or parameters can be indexed, such as, for example, a first element or a second element, as well as a first parameter and a second parameter or even a first criterion and a second criterion, etc. In this case, simple indexing is involved for differentiating and denominating elements or parameters or criteria that are similar, but not identical. This indexing does not imply the priority of one element, parameter or criterion over another and such denominations can be easily interchanged without departing from the scope of the present description. This indexing also does not imply an order over time, for example, for assessing a particular criterion.

In the present description, "placed upstream" is understood to mean that one element is placed before another in relation to the direction of circulation of a fluid. By contrast, "placed downstream" is understood to mean that one element is placed after another in relation to the direction of circulation of the fluid.

Figure 1:
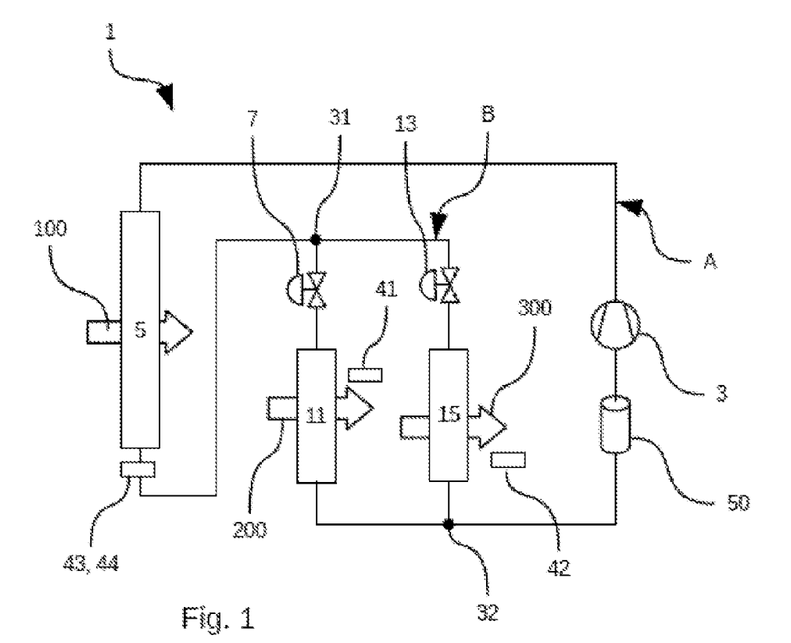
FIG. 1 shows a schematic representation of a thermal management device according to a first embodiment.

FIG. 1 shows a schematic representation of a thermal management device 1 for a motor vehicle according to a simple embodiment. The thermal management device 1 comprises a coolant circuit, in which a coolant is intended to circulate. This coolant circuit comprises a main loop A comprising, in the direction of circulation of the coolant, a compressor 3, a condenser 5 configured to exchange heat energy with a first element 100, a first expansion device 7 and a first evaporator 11. This first evaporator 11 is more particularly configured to exchange heat energy with a second element 200.

The main loop A can also comprise a phase separation device 50 arranged upstream of the compressor 3.

The coolant circuit also comprises a bypass branch B arranged parallel to the first expansion device 7 and the first evaporator 11. This bypass branch B comprises a second expansion device 13 and a second evaporator 15 arranged downstream of the second expansion device 13. The second evaporator 15 is more particularly configured to exchange heat energy with a third element 300.

More specifically, the bypass branch B connects a first 31 and a second 32 connection point to the main loop A. The first connection point 31 is arranged upstream of the first expansion device 7, between the condenser 5 and said first expansion device 7. The second connection point 32 for its part is arranged downstream of the first evaporator 11, between said first evaporator 11 and the compressor 3.

A condenser 5, a first 11 and second evaporator 15 are herein understood to mean a heat exchanger defined by its function. A condenser will then have the function of heating the element with which it exchanges heat energy and an evaporator will have the function of cooling the element with which it exchanges heat energy.

As shown in FIG. 1, the first 100, second 200 and third 300 elements respectively exchanging with the condenser 5 and the first 11 and second 15 evaporators, can be air flows passing through said heat exchangers. However, according to the type of heat exchanger, then clearly there is nothing preventing the first 100, second 200 and third 300 elements from being other types, such as, for example, a heat transfer fluid or an element in direct contact with the evaporator such as batteries, for example. The condenser 5 and the first 11 and second 15 evaporators thus can be, for example, air heat exchangers when the first 100, second 200 and third 300 elements are air flows, can be plate type heat exchangers when they are in direct contact with the first 100, second 200, and third 300 elements or even can be dual-fluid heat exchangers when the first 100, second 200 and third 300 elements are heat transfer fluids circulating in an auxiliary thermal management circuit.

Figure 2:
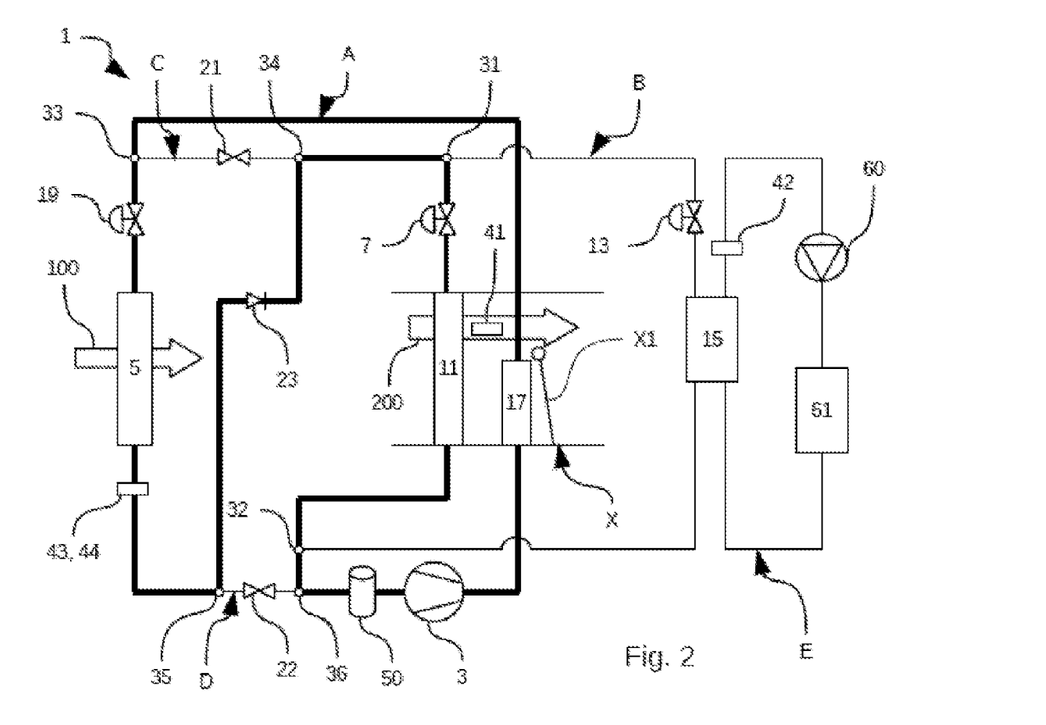
FIG. 2 shows a schematic representation of a thermal management device according to a second embodiment.

FIG. 2 for its part shows an example of a more complex thermal control device 1. In this example, the thermal management device 1 is reversible, i.e. it can equally cool and heat an internal air flow intended for the passenger compartment.

The thermal management device 1 in this case comprises a coolant circuit comprising a main loop A (shown in thick lines in FIG. 2) firstly comprising, in the direction of circulation of the coolant, a compressor 3 and a first heat exchanger 17, configured to exchange heat energy with the second element 200, in this case an internal air flow intended for the passenger compartment. This first heat exchanger 17 in particular can be arranged within a heating, ventilation and air conditioning device X, also called HVAC. This first heat exchanger 17 particularly acts as an internal condenser, i.e. it is configured to yield heat energy to the second element 200, in this case the internal air flow, for example, in a heat pump mode. When the internal air flow is not required, a flap X1 can block the internal air flow and prevent it from passing through the first heat exchanger 17.

The main loop A then comprises a third expansion device 19 arranged upstream of a second heat exchanger 5 configured to exchange heat energy with the first element 100, in this case an external air flow. This third expansion device 19 in particular, when it is fully opened, can allow the coolant to pass through without any loss of pressure. The second heat exchanger 5 in particular can be an evaporator-condenser, i.e. it is configured to act as an external evaporator, i.e. to absorb heat energy in the first element 100, for example, in a heat pump mode. The second heat exchanger 5 also can be configured to act as an external condenser, i.e. it is configured to yield heat energy to the first element 100, for example, in a cooling mode.

The main loop A then comprises a first expansion device 7 arranged upstream of a third heat exchanger 11, configured to exchange heat energy with the second element 200, in this case an internal air flow intended for the passenger compartment. The first expansion device 7 in particular can have a stop function in order to block the coolant. This third heat exchanger 11 in particular can be arranged within the heating, ventilation and air conditioning device X upstream of the first heat exchanger 17 in the direction of circulation of the internal air flow. This third heat exchanger 11 in particular can be configured to act as an internal evaporator, i.e. to absorb heat energy in the second element 200, for example, in a cooling mode.

The main loop A can also comprise a phase separation device 50 arranged upstream of the compressor 3.

As in the case of FIG. 1, the coolant circuit also comprises a bypass branch B arranged parallel to the first expansion device 7 and the third heat exchanger 11. This bypass branch B comprises a second expansion device 13 and a fourth heat exchanger 15 arranged downstream of the second expansion device 13. The fourth heat exchanger 15 is more particularly configured to exchange heat energy with a third element 300.

More specifically, the bypass branch B connects a first 31 and a second 32 connection point to the main loop A. The first connection point 31 is arranged upstream of the first expansion device 7, between the second heat exchanger 5 and said first expansion device 7. The second connection point 32 for its part is arranged downstream of the third heat exchanger 11, between said third heat exchanger 11 and the compressor 3.

The second expansion device 7 in particular can comprise a stop function in order to block the coolant. This fourth heat exchanger 15 in particular can be configured to act as an evaporator, i.e. to absorb heat energy in the third element 300, for example, in a cooling mode. The fourth heat exchanger 15 thus can act as the second evaporator 15.

In the example shown in FIG. 2, the thermal management device 1 comprises an auxiliary circuit E, in which a heat transfer fluid acting as a third element 300 circulates. The fourth heat exchanger 15 for its part is a dual-fluid heat exchanger configured to allow exchanges of heat energy between the coolant and the third element 300.

The auxiliary circuit E in particular can comprise, in the direction of circulation of the heat transfer fluid, a pump 60, a heat exchanger 61 and the fourth heat exchanger 15. The heat exchanger 61 more particularly can be in contact with electronic and/or electrical elements such as batteries, for example, in order to manage their operating temperature.

Still as shown in FIG. 2, the coolant circuit comprises a first bypass pipe C allowing the third expansion device 19 and the second heat exchanger 5 to be bypassed. This first bypass pipe C more particularly connects a third 33 and a fourth 34 connection point. The third connection point 33 is arranged upstream of the third expansion device 19, between the first heat exchanger 17 and said third expansion device 19. The fourth connection point 33 for its part is arranged upstream of the first expansion device 7, between the second heat exchanger 5 and said first expansion device 7, more specifically between the second heat exchanger 5 and the first connection point 31.

The first bypass pipe C particularly comprises a stop valve 21 in order to control whether or not the coolant passes through said pipe. The main loop A can also comprise a non-return valve 23 upstream of the fourth connection point 34 in order to prevent coolant from flowing back toward the second heat exchanger 5 from the first bypass pipe C.

The coolant circuit further comprises a second bypass pipe D allowing the first expansion device 7, the third heat exchanger 11, as well as the bypass branch B, to be bypassed. This second bypass pipe D more specifically connects a fifth 35 and a sixth connection point 36. The fifth connection point 35 is arranged downstream of the second heat exchanger 5, between said second heat exchanger 5 and the first expansion device 7, more specifically between said second heat exchanger 5 and the fourth connection point 34. The sixth connection point 36 for its part is arranged downstream of the second connection point 32, between the second connection point 32 and the compressor 3.

The second bypass pipe D also comprises a stop valve 22 in order to control whether or not the coolant passes through said pipe.

This architecture shown in FIG. 2 enables various operating modes for the thermal management device 1, such as, for example:

- a cooling mode, in which the first heat exchanger 17 is not used and in which the second heat exchanger 5 acts as a condenser, the third heat exchanger 11 acts as the first evaporator and the fourth heat exchanger 15 acts as the second evaporator, in parallel with the first evaporator;
- a heating mode, in which the first heat exchanger 17 acts as a condenser, the second heat exchanger 5 acts as the first evaporator and the fourth heat exchanger 15 acts as the second evaporator, in parallel with the first evaporator, (with the third heat exchanger not being used); or even
- a dehumidification mode, in which the first heat exchanger 17 acts as a condenser, the second heat exchanger 5 acts as the first evaporator and the third heat exchanger 11 acts as the second evaporator, in parallel with the first evaporator, with the fourth heat exchanger 15 not being used or else acting as a third evaporator in parallel with the first and second evaporators.

Other architectures and other operating modes clearly can be contemplated without departing from the scope of the invention as long as the thermal management device 1 comprises a coolant circuit, in which a coolant is intended to circulate, said coolant circuit comprising:

- a main loop comprising, in the direction of circulation of the coolant, a compressor, a condenser configured to exchange heat energy with a first element, a first expansion device and a first evaporator configured to exchange heat energy with a second element;
- a bypass branch arranged parallel to the first expansion device and the first evaporator, said bypass branch comprising a second expansion device and a second evaporator arranged downstream of the second expansion device and configured to exchange heat energy with a third element.

Throughout the remainder of the present description, for the sake of clarity, the example of a cooling mode has been used, in which mode the condenser is the second heat exchanger 5, the first evaporator is the third heat exchanger 11 and the second evaporator is the fourth heat exchanger 15.

The present invention thus relates to a method for managing the thermal management device 1.

In the present description, references will be used to determine certain parameters:

T11-$sp$ corresponds to a setpoint value of the temperature of the second element 200 at the outlet of the first evaporator 11;

T11-$m$ corresponds to the measured or determined value of the temperature of the second element 200 at the outlet of the first evaporator 11;

T15-$sp1$, T15-$sp2$ and T15-$sp3$ correspond to a setpoint value of the temperature of the third element 300 at the outlet of the second evaporator 15;

T15-$m$ corresponds to the measured or determined value of the temperature of the third element 300 at the outlet of the second evaporator 15;

SBC-sp corresponds to a setpoint value for sub-cooling the coolant at the outlet of the first evaporator 11;

SBC-calc corresponds to the computed value of the sub-cooling of the coolant at the outlet of the first evaporator 11.

As long as the maximum cooling capacity of the thermal management device 1 is greater than or equal to the sum of the cooling power required for each evaporator, each evaporator is able to provide the required cooling power.

A priority request then can be issued to define which of the two evaporators is prioritized with respect to the distribution of the available cooling power. Thus, when the maximum cooling capacity of the thermal management device is less than the sum of the cooling power required for each evaporator, the method will allow the evaporator designated as the priority evaporator to provide this evaporator with the required cooling power. The other evaporator will only provide the difference between the total available power and the power allocated to the priority evaporator, with this amount being less than the required power.

Figure 3:
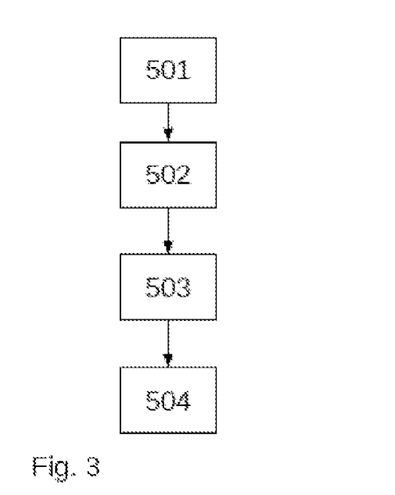
FIG. 3 shows a flow chart of the steps of the thermal management method when a request for cooling priority via the first evaporator is issued.

Priority of Cooling Via the First Evaporator 11:

When:

- at least the first evaporator 11 is used so that the temperature of the second element 200 at the outlet of the first evaporator 11 reaches a setpoint temperature Ti i-sp,
- a request to use the second evaporator 15 is issued so that the third element 300 reaches a first setpoint temperature T15-$sp1$,
- the cooling power required for simultaneous operation of the first 11 and second 15 evaporators is greater than the maximum cooling capacity of the thermal management device 1, and
- the thermal management device 1 receives a request for cooling priority via the first evaporator the management method comprises the steps shown in the flow chart of FIG. 3.

A first step 501 is a step of increasing the speed of rotation of the compressor 3 to its maximum speed. This maximum speed of the compressor 3 in particular can be defined by resistance constraints that are specific to the compressor 3 or even by imposed limits such as a limitation of the energy consumption or a limited available power. For example, according to the compressor models 3, the maximum speed can be 5,000 rpm (revolutions per minute).

A second step 502 is a step of determining a modified setpoint temperature T15-$sp3$ of the third element 300 that is greater than the first setpoint temperature T15-$sp1$ so that the temperature of the second element 200 at the outlet of the first evaporator 11 tends toward its setpoint temperature T11-$sp$. The temperature of the second element 200 at the outlet of the first evaporator 11 can be measured, for example, by a first temperature sensor 41 arranged at the outlet of the first evaporator 11 at the second element 200.

A third step 503 is a step of adjusting the opening diameter of the second expansion device 13 so that the temperature of the third element 300 at the outlet of the second evaporator 15 reaches the modified setpoint temperature T15-$sp3$, until the temperature of the second element 200 at the outlet of the first evaporator 11 reaches the setpoint temperature T11-$sp$. The temperature of the third element 300 at the outlet of the second evaporator 15 can be measured, for example, by a second temperature sensor 42 arranged at the outlet of the second evaporator 15 at the third element 300.

Increasing the speed of rotation of the compressor 3 to its maximum speed allows the thermal management device 1 to reach its maximum cooling capacity. Modifying the setpoint temperature T15-sp1 of the third element 300 at the outlet of the second evaporator 15 into a modified setpoint temperature T15-sp3 allows the cooling of the second element 200, for example, an internal air flow, to be prioritized. Thus, more cooling power is allocated to the first evaporator 11 for cooling the second element 200 than to the second evaporator 15 for cooling the third element 300.

According to a first example, in which the conditions are as follows:
 the ambient temperature is 40° C.;
 the thermal management device 1 has a maximum cooling capacity of 5,600 W;
 the compressor 3 has a maximum speed of 5,000 rpm;
 only the first evaporator 11 is used to cool the second element 200 to a setpoint temperature T11-sp of 11° C.;
 the speed of the compressor 3 is of the order of 2,400 rpm; and
 the cooling power allocated to cooling the second element 200 is 3,000 W;
if cooling the third element 300 via the second evaporator 15 is requested at a power of 3,600 W in order to reach a setpoint temperature T15-sp1 of 20° C., then the cooling capacity of the thermal management device 1 is exceeded by 1,000 W.

At the same time, if a request for cooling priority via the first evaporator 11 is issued then the speed of the compressor 3 is increased to 5,000 rpm. The setpoint temperature T15-sp1 is increased to a setpoint temperature T15-sp3 so that the power allocated to cooling the third element 300 is only 2,600 W. The opening of the second expansion device 13 is then adjusted so that the temperature T15-m of the third element 300 at the outlet of the second evaporator 15 reaches the modified setpoint temperature T15-sp3 until the temperature T11-m of the second element 200 at the outlet of the first evaporator 11 reaches its setpoint temperature T11-sp of 11° C.

The management method can also comprise a step 504 of adjusting the opening diameter of the first expansion device 7 so that the sub-cooling of the coolant at the outlet of the condenser 5 reaches a sub-cooling setpoint value SBC-sp. The sub-cooling SBC-calc is computed according to the following formula:

$$SBC\text{-}calc = TreCO - Tsat(PreCO),$$

with TreCO being the temperature of the coolant at the outlet of the condenser 5 and Tsat (PreCO) being the saturation temperature of the coolant at the coolant pressure at the outlet of the condenser 5. The temperature TreCO of the coolant at the outlet of the condenser 5 can be measured, for example, by a third temperature sensor 43 arranged in the coolant circuit at the outlet of the condenser 5. The pressure PreCO of the coolant at the outlet of the condenser 5 can be measured, for example, by a pressure sensor 44 arranged in the coolant circuit at the outlet of the condenser 5.

The third temperature sensor 43 and the pressure sensor 44 can be grouped within the same pressure-temperature sensor.

The sub-cooling setpoint value SBC-sp for its part can be determined according to the following formula:

$$SBC\text{-}sp = (((mr/\ln(Pd+\beta))/k)-1)/\alpha,$$

with mr being the flow rate of the coolant, Pd being the coolant pressure at the outlet of the compressor 3, $\alpha = 4.525^{-2}$, $\beta = 1.7308$ and $$k = 14.089 \times d^2,$$

d being the theoretical opening diameter of the first expansion device 7 in millimeters for an optimal coefficient of performance. This diameter d is particularly obtained from experimental tables according to different temperature conditions.

Priority of Cooling Via the Second Evaporator 15:
When:
 at least the first evaporator 11 is used so that the temperature of the second element 200 at the outlet of the first evaporator 11 reaches a setpoint temperature Ti i-sp,
 a request to use the second evaporator 15 is issued so that the third element 300 reaches a first setpoint temperature T15-sp1,
 the required cooling power is greater than the maximum cooling capacity of the thermal management device 1, and
 the thermal management device 1 receives a request for cooling priority via the second evaporator 15,
the management method comprises the steps shown in the flow chart of FIG. 4.

Figure 4:
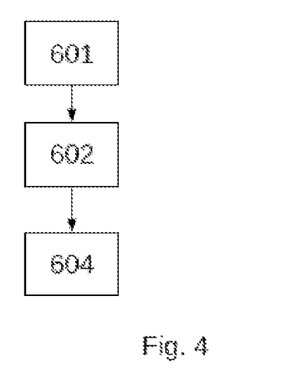
FIG. 4 shows a flow chart of the steps of the thermal management method when a request for cooling priority via the second evaporator is issued.

As before, a first step 601 is a step of increasing the speed of rotation of the compressor 3 to its maximum speed. This maximum speed of the compressor 3 in particular can be defined by resistance constraints that are specific to the compressor 3 or even by imposed limits such as a limitation of the energy consumption or a limited available power. For example, according to the compressor models 3, the maximum speed can be 5,000 rpm.

A second step 602 is a step of adjusting the opening diameter of the second expansion device 13 until the temperature of the third element 300 at the outlet of the second evaporator 15 reaches the first setpoint temperature T15-sp1. Unlike before, the setpoint temperature T15-sp1 is not modified.

Increasing the speed of rotation of the compressor 3 to its maximum speed allows the thermal management device 1 to reach its maximum cooling capacity. Directly adjusting the opening of the second expansion device 13 so that the temperature of the third element 300 reaches its setpoint temperature T15-sp1 at the outlet of the third evaporator 15 allows the cooling of the third element 300 to be prioritized, for example, for cooling batteries. Thus, more cooling power is allocated to the second evaporator 15 for cooling the third element 300 than to the first evaporator 11 for cooling the second element 200.

According to a second example, in which the conditions are as follows:
 the ambient temperature is 40° C.;
 the thermal management device 1 has a maximum cooling capacity of 5,600 W;
 the compressor 3 has a maximum speed of 5,000 rpm;
 the first evaporator 11 is used to cool the second element 200 to a setpoint temperature Ti i-sp of 11° C., with an allocated power of 2,000 W;
 the second evaporator 15 is used to cool the third element 300 to a setpoint temperature T15-sp1 of 24° C., with an allocated power of 1,000 W; and
 the speed of the compressor 3 is of the order of 2,400 rpm.
Increasing the cooling of the third element 300 via the second evaporator 15 is requested at a power of 3,600 W to reach a setpoint temperature T15-*sp*1 of 20° C., then the cooling capacity of the thermal management device 1 is exceeded by 1,000 W.

At the same time, if a request for cooling priority via the second evaporator 15 is issued, then the speed of the compressor 3 is increased to 5,000 rpm. The opening of the second expansion device 13 is then adjusted until the temperature T15-*m* of the third element 300 at the outlet of the second evaporator 15 reaches the setpoint temperature T15-*sp*1.

Also as before, the management method can also comprise a step 604 of adjusting the opening diameter of the first expansion device 7 so that sub-cooling the coolant at the outlet of the condenser 5 reaches a sub-cooling setpoint value SBC-sp. The sub-cooling SBC-calc is computed according to the following formula:

SBC-calc=TreCO−$T$sat(PreCO), with TreCO being the temperature of the coolant at the outlet of the condenser 5 and Tsat (PreCO) being the saturation temperature of the coolant at the coolant pressure at the outlet of the condenser 5. The temperature TreCO of the coolant at the outlet of the condenser 5 can be measured, for example, by a third temperature sensor 43 arranged in the coolant circuit at the outlet of the condenser 5. The pressure PreCO of the coolant at the outlet of the condenser 5 can be measured, for example, by a pressure sensor 44 arranged in the coolant circuit at the outlet of the condenser 5.

The third temperature sensor 43 and the pressure sensor 44 can be grouped within the same pressure-temperature sensor.

The sub-cooling setpoint value SBC-sp for its part can be determined according to the following formula:

SBC-sp=(((*mr*/ln(*Pd*+β))/*k*)−1)/α, with mr being the flow rate of the coolant, Pd being the coolant pressure at the outlet of the compressor 3, α=4.525$^{-}$$_{2}$, β=1.7308 and

*k*=14.089×*d*$^{2}$, d being the theoretical opening diameter of the first expansion device 7 in millimeters for an optimal coefficient of performance. This diameter d is particularly obtained from experimental tables according to different temperature conditions.

Figure 5:
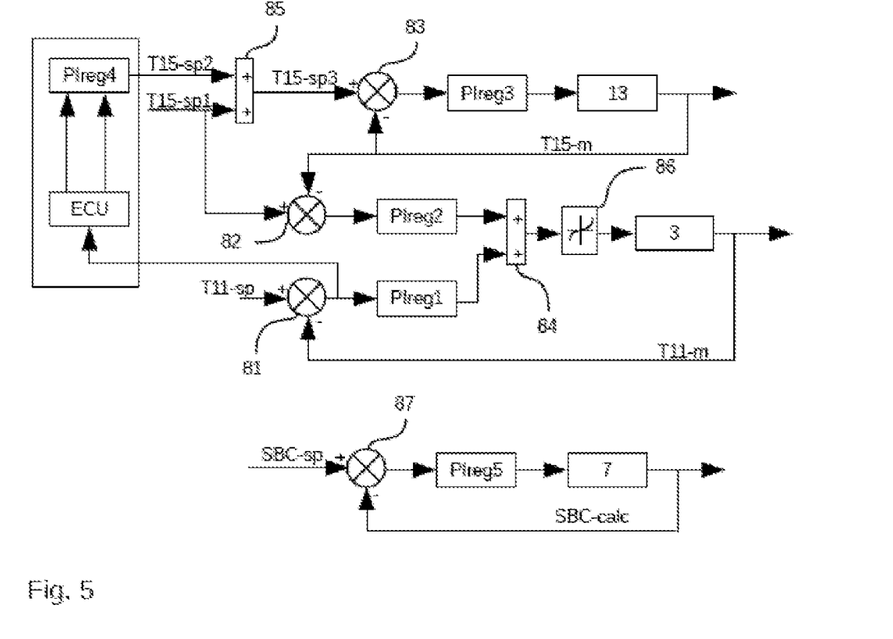
FIG. 5 shows a functional diagram of the thermal management device.

FIG. 5 shows a partial functional diagram of the thermal management device 1 for implementing the management method described above.

The thermal management device 1 thus can comprise a first proportional-integral controller PIreg1. This first proportional-integral controller PIreg1 is particularly configured to control the speed of rotation of the compressor 3. This control is carried out as a function of the difference between the temperature T11-*m* of the second element 200 at the outlet of the first evaporator 11, for example, measured by the first temperature sensor 41, and a setpoint temperature T11-*sp* of the second element 200 at the outlet of the first evaporator 11.

The difference between the temperature T11-*m* and the setpoint temperature T11-*sp* in particular can be established by a first comparator 81 arranged upstream of the first proportional-integral controller PIreg1.

The thermal management device 1 can also comprise a second proportional-integral controller PIreg2. This second proportional-integral controller PIreg2 is also configured to control the speed of rotation of the compressor 3 as a function of the difference between the temperature T15-*m* of the third element 300 at the outlet of the second evaporator 15 and a first setpoint temperature T15-*sp*1 of the third element 300 at the outlet of the second evaporator 15.

The difference between the temperature T15-*m* and the setpoint temperature T15-*sp*1 in particular can be established by a second comparator 82 arranged upstream of the second proportional-integral controller PIreg2.

The thermal management device 1 can also comprise a first adder 85 arranged upstream of the compressor 3 and configured to add the speed of rotation signals output from the first PIreg1 and second PIreg2 proportional-integral controllers. The speed of the compressor 3 is thus managed both as a function of the use of the first evaporator 11 and of the second evaporator 15 and of their setpoint temperatures T11-*sp* and T15-*sp*1.

The thermal management device 1 can further comprise a limiter 86 arranged between the first adder 85 and the compressor 3 in order to limit the control signal arriving at the compressor 3 and to thus prevent said compressor from exceeding its recommended maximum speed.

The thermal management device 1 can also comprise a third proportional-integral controller PIreg3. This third proportional-integral controller PIreg3 is particularly configured to adjust the opening diameter of the second expansion device 13 as a function of the difference between the temperature T15-*m* of the third element 300 at the outlet of the second evaporator 15 and a setpoint temperature T15-*sp*3 of the third element 300 at the outlet of the second evaporator 15.

The difference between the temperature T15-*m* and the setpoint temperature T15-*sp*3 in particular can be established by a third comparator 83 arranged upstream of the third proportional-integral controller PIreg3.

The thermal management device 1 can also comprise an electronic control unit ECU configured to determine a second setpoint temperature T15-*sp*2 of the third element 300 at the outlet of the second evaporator 15 according to the difference between the temperature T11-*m* of the second element 200 at the outlet of the first evaporator 11 and the setpoint temperature T11-*sp* of the second element 200 at the outlet of the first evaporator 11. To this end, the electronic control unit ECU can receive the signals originating from the second comparator 82.

Furthermore, the thermal management device 1 can comprise a second adder 85 configured to add the first T15-*sp*1 and the second T5-*sp*2 temperature setpoint of the third element 300 at the outlet of the second evaporator 15 in order to determine the setpoint temperature T15-*sp*3 for the third proportional-integral controller PIreg3.

The electronic control unit ECU thus can, by varying the second setpoint temperature T15-*sp*2, modify the setpoint temperature T15-*sp*3.

In the case whereby a request for cooling priority via the first evaporator 11 is issued, the electronic control unit ECU applies a second setpoint temperature T15-*sp*2 in order to increase the setpoint temperature T15-*sp*3. Indeed, by virtue of the second adder 85, T15-*sp*3=T15-*sp*1+T15-*sp*2.

In the case whereby a request for cooling priority via the second evaporator 15 is issued, the electronic control unit ECU does not apply a second setpoint temperature T15-*sp*2 and thus, at the output of the second adder 85, T15-*sp*3=T15-*sp*1.

The request for cooling priority via the first evaporator 11 and the request for cooling priority via the second evaporator 15 are requests that are particularly defined in the electronic control unit ECU. These requests for priority depend on the conditions of use and the modes of use of the motor vehicle. These requests for priority can also vary as a function of the recommendations of the automotive manufacturers.

As is still shown in FIG. 5, the thermal management device 1 can further comprise a fourth proportional-integral controller PIreg4 configured to control the second setpoint temperature T15-*sp*2 of the third element 300 at the outlet of the second evaporator 15 as a function of a setpoint determined by the electronic control unit ECU. This setpoint is a function of the request for priority.

If the electronic control unit ECU receives a request for cooling priority via the second evaporator 15, then it transmits an error setpoint to the fourth proportional-integral controller PIreg4 so that the second setpoint temperature T15-*sp*2 is zero.

If the electronic control unit ECU receives a request for cooling priority via the first evaporator 11, then it transmits a control setpoint to the fourth proportional-integral controller PIreg4 as a function of the difference between the temperature T11-*m* of the second element 200 at the outlet of the first evaporator 11 and the setpoint temperature T11-*sp* of the second element 200 at the outlet of the first evaporator 11 so that the second setpoint temperature T15-*sp*2 is non-zero.

As is still shown in FIG. 5, the thermal management device 1 can comprise a fifth proportional-integral controller PIreg5. This fifth proportional-integral controller PIreg5 is particularly configured to adjust the opening diameter of the first expansion device 7 as a function of the difference between the computed sub-cooling SBC-calc of the coolant at the outlet of the condenser 5 and the setpoint value SBC-sp of the sub-cooling of the coolant at the outlet of the condenser 5.

Thus, it is clear that the thermal management method, as well as the associated thermal management device, allow good management of priority with respect to the use of the first 11 or of the second 15 evaporator when the maximum cooling capacity of the thermal management device 1 is not sufficient for both the second element 200 and the third element 300 to reach their respective setpoint temperature.

The invention claimed is:

1. A method for managing a thermal management device for a motor vehicle comprising a coolant circuit, in which a coolant is configured to circulate, said coolant circuit comprising:
a main loop comprising, in the direction of circulation of the coolant, a compressor, a condenser configured to exchange heat energy with a first element, a first expansion device and a first evaporator configured to exchange heat energy with a second element;
a bypass branch arranged parallel to the first expansion device and the first evaporator, said bypass branch comprising a second expansion device and a second evaporator arranged downstream of the second expansion device and configured to exchange heat energy with a third element,
in response to at least the first evaporator being used so that the temperature of the second element at the outlet of the first evaporator reaches a setpoint temperature,
a request to use the second evaporator is issued so that the third element reaches a first setpoint temperature,
so that the cooling power required for the simultaneous operation of the first and second evaporators is greater than the maximum cooling capacity of the thermal management device, and so that the thermal management device receives a request for cooling priority via the first evaporator, the method comprising:
increasing the speed of rotation of the compressor to its maximum speed;
determining a modified setpoint temperature of the third element that is greater than the first setpoint temperature so that the temperature of the second element at the outlet of the first evaporator tends toward its setpoint temperature; and
adjusting the opening diameter of the second expansion device so that the temperature of the third element at the outlet of the second evaporator reaches the modified setpoint temperature, until the temperature of the second element at the outlet of the first evaporator reaches the setpoint temperature.

2. The method for managing the thermal management device as claimed in claim 1, wherein:
in response to at least the first evaporator being used so that the temperature of the second element at the outlet of the first evaporator reaches the setpoint temperature,
a request to use the second evaporator is issued so that the third element reaches the first setpoint temperature,
so that the required cooling power is greater than the maximum cooling capacity of the thermal management device, and
so that the thermal management device receives a request for cooling priority via the second evaporator, the method further comprising:
increasing the speed of rotation of the compressor to its maximum speed;
adjusting the opening diameter of the second expansion device until the temperature of the third element at the outlet of the second evaporator reaches the first setpoint temperature.

3. The method for managing the thermal management device as claimed in claim 1, further comprising: adjusting the opening diameter of the first expansion device so that the sub-cooling of the coolant at the outlet of the condenser reaches a sub-cooling setpoint value, the sub-cooling being computed according to the following formula:

$$\text{SBC-calc} = \text{TreCO} - T\text{sat}(\text{PreCO}),$$

with SBC-calc being the computed sub-cooling, TreCO being the temperature of the coolant at the outlet of the condenser and Tsat (PreCO) being the saturation temperature of the coolant at the pressure of the coolant at the outlet of the condenser.

4. The method for managing the thermal management device as claimed in claim 3, wherein the sub-cooling setpoint value (SBC-sp) is determined according to the following formula:

$$\text{SBC-sp} = (((mr/\ln(Pd+\beta))/k)-1)/\alpha,$$

with mr being the flow rate of the coolant, Pd being the coolant pressure at the outlet of the compressor (3), $\alpha=4.525^{-2}$, $\beta=1.7308$ and $k=14.089\chi\ d^2$, d being the theoretical opening diameter of the first expansion device in millimeters for an optimal coefficient of performance.

5. A thermal management device for a motor vehicle comprising a coolant circuit, in which a coolant is intended to circulate, said coolant circuit comprising:
a main loop comprising, in the direction of circulation of the coolant, a compressor, a condenser configured to exchange heat energy with a first element, a first expansion device and a first evaporator configured to exchange heat energy with a second element;

a bypass branch arranged parallel to the first expansion device and the first evaporator, said bypass branch comprising a second expansion device and a second evaporator arranged downstream of the second expansion device and configured to exchange heat energy with a third element;

the thermal management device further comprising:

a first proportional-integral controller configured to control the speed of rotation of the compressor as a function of the difference between the temperature of the second element at the outlet of the first evaporator and a setpoint temperature of the second element at the outlet of the first evaporator;

a second proportional-integral controller configured to control the speed of rotation of the compressor as a function of the difference between the temperature of the third element at the outlet of the second evaporator and a first setpoint temperature of the third element—at the outlet of the second evaporator;

a first adder arranged upstream of the compressor and configured to add the speed of rotation signals output from the first and second proportional-integral controllers;

a third proportional-integral controller configured to adjust the opening diameter of the second expansion device as a function of the difference between the temperature of the third element at the outlet of the second evaporator and a setpoint temperature of the third element at the outlet of the second evaporator;

an electronic control unit (ECU) configured to determine a second setpoint temperature of the third element at the outlet of the second evaporator according to the difference between the temperature of the second element at the outlet of the first evaporator and the setpoint temperature of the second element at the outlet of the first evaporator;

a second adder configured to add the first and the second setpoint temperature of the third element at the outlet of the second evaporator in order to determine the setpoint temperature for the third proportional-integral controller.

6. The thermal management device as claimed in claim 5, further comprising: a fourth proportional-integral controller configured to control the second setpoint temperature of the third element at the outlet of the second evaporator as a function of a setpoint determined by the electronic control unit (ECU).

7. The thermal management device as claimed in claim 1, wherein the thermal management device comprises a fifth proportional-integral controller configured to adjust the opening diameter of the first expansion device as a function of the difference between the computed sub-cooling of the coolant at the outlet of the condenser and the setpoint value of the sub-cooling of the coolant at the outlet of the condenser.

8. The thermal management device as claimed in claim 5, wherein:
   the condenser is a heat exchanger arranged in the front face of the motor vehicle and the first element is an external air flow;
   the first evaporator is a heat exchanger arranged within a heating, ventilation and air conditioning device and the second element is an internal air flow intended for the passenger compartment, and
   the second evaporator is configured to cool electrical and/or electronic elements such as batteries.

9. The thermal management device as claimed in claim 1, further comprising an auxiliary circuit, in which the third element circulates, the second evaporator being a dual-fluid heat exchanger configured to allow heat exchanges between the coolant and the third element.

10. The thermal management device as claimed in claim 5, further comprising: a limiter arranged between the first adder and the compressor.

* * * * *